United States Patent
Kim et al.

(10) Patent No.: US 9,937,905 B2
(45) Date of Patent: Apr. 10, 2018

(54) SIDE COLLISION AVOIDANCE SYSTEM AND METHOD FOR VEHICLE

(71) Applicant: Hyundai Motor Company, Seoul (KR)

(72) Inventors: Jun Soo Kim, Seoul (KR); Jeong Jae Yoo, Incheon (KR); Jin Ho Park, Gyeonggi-do (KR); Hyung Jun Lim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 15/182,641

(22) Filed: Jun. 15, 2016

(65) Prior Publication Data

US 2017/0274876 A1    Sep. 28, 2017

(30) Foreign Application Priority Data

Mar. 22, 2016   (KR) .......................... 10-2016-0033855

(51) Int. Cl.
*B60T 7/22*     (2006.01)
*B60W 50/14*    (2012.01)
(Continued)

(52) U.S. Cl.
CPC .............. *B60T 7/22* (2013.01); *B60W 10/18* (2013.01); *B60W 30/08* (2013.01); *B60W 30/095* (2013.01); *B60W 30/0953* (2013.01); *B60W 30/0956* (2013.01); *B60W 50/14* (2013.01); *G01S 13/862* (2013.01); *G01S 13/87* (2013.01); *G01S 13/931* (2013.01); *G01S 15/87* (2013.01); *G01S 15/931* (2013.01);
(Continued)

(58) Field of Classification Search
None
See application file for complete search history.

(56) References Cited

U.S. PATENT DOCUMENTS 5,408,414 A *  4/1995  Nomoto .............. G01C 21/005
                                              342/451
6,437,688 B1   8/2002  Kobayashi
(Continued)

FOREIGN PATENT DOCUMENTS

JP   2000-330637 A    11/2000
JP   2006528106 A     12/2006
(Continued)

*Primary Examiner* — Calvin Cheung
(74) *Attorney, Agent, or Firm* — Mintz Levin Cohn Ferris Glovsky and Popeo, P.C.; Peter F. Corless

(57) ABSTRACT

A side collision avoidance system and method for a vehicle combines data from radar sensors mounted on front and rear surfaces of the vehicle with data from ultrasonic sensors mounted on side surfaces of the vehicle, and detects obstacles on the basis of the combined data, so as to increase accuracy in the detection of obstacles and predict the probability of collisions with obstacles with high accuracy. The system includes: radar sensors detecting an obstacle around the vehicle; ultrasonic sensors detecting the obstacle around the vehicle; a controller combining sensor data from the radar sensors with sensor data from the ultrasonic sensors to generate combined data, detecting the obstacle on the basis of the combined data, and predicting collision or non-collision with the detected obstacle on the basis of the combined data; and a brake driver braking the vehicle when the collision is predicted.

17 Claims, 11 Drawing Sheets

(51) Int. Cl.
  *G01S 13/93* (2006.01)
  *G01S 15/93* (2006.01)
  *G01S 13/86* (2006.01)
  *B60W 10/18* (2012.01)
  *B60W 30/08* (2012.01)
  *B60W 30/095* (2012.01)
  *G01S 13/87* (2006.01)
  *G01S 15/87* (2006.01)

(52) U.S. Cl.
  CPC .. *B60T 2201/022* (2013.01); *B60W 2050/143* (2013.01); *B60W 2420/52* (2013.01); *B60W 2420/54* (2013.01); *B60W 2550/10* (2013.01); *G01S 2013/9332* (2013.01); *G01S 2013/9346* (2013.01); *G01S 2013/9375* (2013.01); *G01S 2013/9378* (2013.01); *G01S 2015/937* (2013.01)

(56) References Cited

U.S. PATENT DOCUMENTS

| | | | |
|---|---|---|---|
| 8,760,962 B2 * | 6/2014 | Kloss | G01S 7/52004 367/13 |
| 2003/0225546 A1 * | 12/2003 | Alfano | G08G 5/045 702/150 |
| 2004/0024527 A1 * | 2/2004 | Patera | G08G 5/045 701/301 |
| 2004/0047518 A1 | 3/2004 | Tiana | |
| 2004/0181338 A1 * | 9/2004 | Dobler | G08G 1/165 701/301 |
| 2005/0278098 A1 * | 12/2005 | Breed | B60R 21/0134 701/45 |
| 2006/0080005 A1 * | 4/2006 | Lee | B60Q 1/22 701/1 |
| 2007/0063874 A1 | 3/2007 | Danz et al. | |
| 2009/0125181 A1 * | 5/2009 | Luke | B60C 23/061 701/36 |
| 2009/0146842 A1 | 6/2009 | Jung | |
| 2014/0336841 A1 | 11/2014 | Shin et al. | |
| 2015/0134295 A1 * | 5/2015 | Kim | G01S 19/00 702/152 |
| 2015/0239437 A1 * | 8/2015 | Ignaczak | B60T 7/22 701/70 |
| 2016/0075325 A1 | 3/2016 | Kim et al. | |
| 2017/0210379 A1 * | 7/2017 | Obata | B60W 30/18163 |

FOREIGN PATENT DOCUMENTS

| | | |
|---|---|---|
| JP | 2008-168851 A | 7/2008 |
| JP | 2009-244985 A | 10/2009 |
| JP | 5607410 B2 | 10/2014 |
| KR | 10-0796707 B1 | 1/2008 |
| KR | 10-2009-0042534 A | 4/2009 |
| KR | 1020090022129 A | 4/2009 |
| KR | 10-2011-0116777 A | 10/2011 |
| KR | 1020120094366 A | 8/2012 |
| KR | 1020130028183 A | 3/2013 |
| KR | 10-2013-0078382 A | 7/2013 |
| KR | 10-2014-0118153 A | 10/2014 |
| KR | 101449175 B1 | 10/2014 |
| KR | 1020140118611 A | 10/2014 |
| KR | 101477231 B1 | 12/2014 |
| KR | 10-1526815 B1 | 6/2015 |

* cited by examiner

SIDE COLLISION AVOIDANCE SYSTEM AND METHOD FOR VEHICLE

CROSS-REFERENCE TO RELATED APPLICATION

This application claims under 35 U.S.C. § 119(a) the benefit of Korean Patent Application No. 10-2016-0033855, filed on Mar. 22, 2016 in the Korean Intellectual Property Office, the entire contents of which are incorporated by reference herein.

BACKGROUND (a) Technical Field

The present invention relates to a side collision avoidance system and method for a vehicle, more particularly, to a system and method for increasing accuracy in the detection of obstacles by combining ultrasonic sensor data with radar sensor data and predicting the probability of collisions with obstacles with high accuracy when a vehicle that is parallel parked exits a parking space.

(b) Description of the Related Art

In recent years, traffic congestion and parking problems have worsened in certain geographical areas. As the number of vehicles increases in a particular region, city, and country, available parking spaces are reduced. In order to address the lack of parking spaces, the size of a parking space for a single vehicle may be narrowed.

In addition, when many vehicles are parked in a parking lot even without visible parking markings, distances between vehicles are reduced. In this case, drivers may have difficulties in recognizing surrounding obstacles with the naked eye and maneuvering their vehicles to park in narrow parking spaces or exit the narrow parking spaces.

Accordingly, a smart parking assist system (SPAS) has been mounted in vehicles, and automatic parking or automatic exit technology utilizing images of the surrounding environment captured by the SPAS has been developed. Typically an SPAS automatically steers the vehicle when parking in a parking space, to assist parking or exit procedures.

However, when a vehicle, especially a vehicle that has been parallel parked, exits a parking space by using the SPAS, objects present at the left and right sides of the vehicle may not be detected, thereby resulting in collisions. Accordingly, it is necessary to detect the objects present at the left and right sides of the vehicle in order to allow the vehicle to exit the parking space safely and conveniently.

Conventionally, side collision avoidance technology uses radar sensors mounted on the rear of a vehicle so as to detect vehicles approaching from behind and output rear vehicle detection signals. In addition, such technology may utilize a plurality of ultrasonic sensors mounted on the sides of the vehicle so as to detect vehicles approaching from the sides and output side vehicle detection signals, where this technology may detect obstacles on the basis of the output signals of the sensors.

Since the conventional side collision avoidance technology uses radar sensor data and ultrasonic sensor data independently to detect obstacles, complementary functions of respective sensors may not be utilized, and thus accuracy in the detection of obstacles may be reduced. In addition, it may be difficult to predict the probability of collisions with obstacles with high accuracy.

SUMMARY

An aspect of the present invention provides a side collision avoidance system and method for a vehicle configured to combine data from radar sensors mounted on front and rear surfaces of the vehicle with data from ultrasonic sensors mounted on side surfaces of the vehicle so as to detect obstacles on the basis of the combined data, thereby increasing accuracy in the detection of obstacles and predicting the probability of collisions with obstacles with high accuracy.

The objects of the present invention are not limited to the foregoing objects, and any other objects and advantages not mentioned herein will be clearly understood from the following description. The present inventive concept will be more clearly understood from exemplary embodiments of the present invention. In addition, it will be apparent that the objects and advantages of the present invention can be achieved by elements and features claimed in the claims and a combination thereof.

According to an aspect of the present invention, a side collision avoidance system for a vehicle includes: a plurality of radar sensors configured to detect an obstacle around the vehicle; a plurality of ultrasonic sensors configured to detect the obstacle around the vehicle; a controller combining sensor data from the radar sensors with sensor data from the ultrasonic sensors to generate combined data, detecting the obstacle on the basis of the combined data, and predicting collision or non-collision with the detected obstacle on the basis of the combined data; and a brake driver configured to brake the vehicle when the collision is predicted.

According to another aspect of the present invention, a side collision avoidance method for a vehicle includes steps of: generating, by a controller, combined data by combining sensor data from radar sensors with sensor data from ultrasonic sensors; detecting, by the controller, an obstacle on the basis of the combined data; predicting, by the controller, collision or non-collision with the detected obstacle on the basis of the combined data; and braking, by a brake driver, the vehicle when the collision is predicted.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
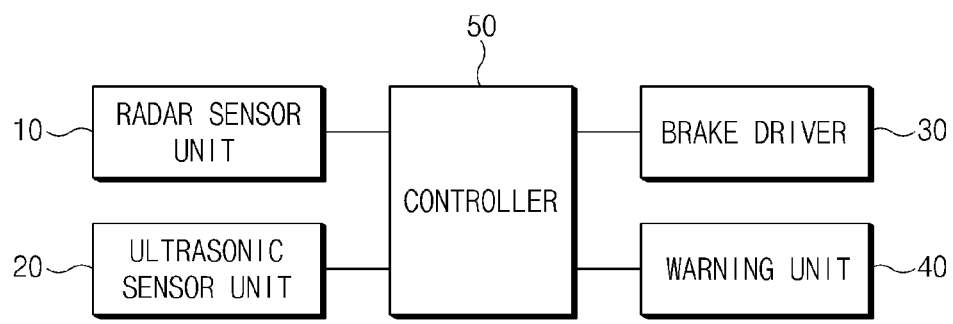
FIG. 1 is a block diagram of a side collision avoidance system for a vehicle, according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The above and other objects, features and advantages of the present invention will be more clearly understood from the following detailed description taken in conjunction with the accompanying drawings so that those skilled in the art to which the present invention pertains can easily carry out technical ideas described herein. In addition, a detailed description of well-known techniques associated with the present invention will be ruled out in order not to unnecessarily obscure the gist of the present invention. Hereinafter, exemplary embodiments of the present invention will be described in detail with reference to the accompanying drawings.

FIG. 1 illustrates the configuration of a side collision avoidance system for a vehicle, according to an exemplary embodiment of the present invention.

As illustrated in FIG. 1, the side collision avoidance system for a vehicle, according to the exemplary embodiment of the present invention, includes a radar sensor unit 10, an ultrasonic sensor unit 20, a brake driver 30, a warning unit 40, and a controller 50.

Figure 2:
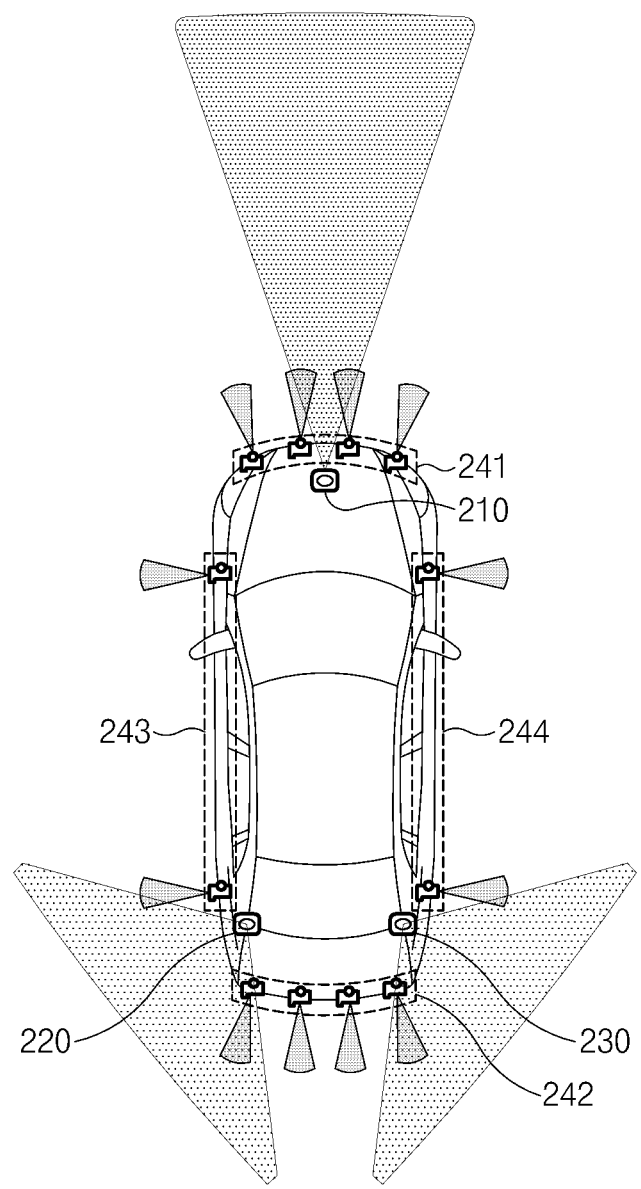
FIG. 2 is a top schematic view of a vehicle including positions of radar sensors and ultrasonic sensors mounted in the vehicle, according to an exemplary embodiment of the present invention.

With respect to each of the aforementioned elements, first, the radar sensor unit 10 may detect obstacles positioned in front of and behind a vehicle. As illustrated in FIG. 2, a plurality of radar sensors 210, 220, and 230 may be mounted in the vehicle.

The radar sensor 210 mounted on a front surface of the vehicle may detect obstacles positioned in front of the vehicle. The radar sensor 220 mounted on the left side of a rear surface of the vehicle may detect obstacles positioned at the left side of and behind the vehicle. The radar sensor 230 mounted on the right side of the rear surface of the vehicle may detect obstacles positioned at the right side of and behind the vehicle.

Next, the ultrasonic sensor unit 20 may detect obstacles positioned in front of and behind the vehicle and positioned at the left and right sides of the vehicle. As illustrated in FIG. 2, a plurality of ultrasonic sensors 241, 242, 243, and 244 may be mounted in the vehicle. In particular, the ultrasonic sensor 243 mounted on a left side surface of the vehicle includes a front ultrasonic sensor and a rear ultrasonic sensor, and the ultrasonic sensor 244 mounted on a right side surface of the vehicle also includes a front ultrasonic sensor and a rear ultrasonic sensor.

The plurality of ultrasonic sensors 241 mounted on the front surface of the vehicle may detect obstacles positioned in front of the vehicle, and the plurality of ultrasonic sensors 242 mounted on the rear surface of the vehicle may detect obstacles positioned behind the vehicle.

In addition, the plurality of ultrasonic sensors 243 mounted on the left side surface of the vehicle may detect obstacles positioned at the left side of the vehicle, and the plurality of ultrasonic sensors 244 mounted on the right side surface of the vehicle may detect obstacles positioned at the right side of the vehicle.

As illustrated in FIG. 2, since the radar sensors 210, 220, and 230 have wide and long-range detection areas, they may measure distances to obstacles that are distant from the vehicle, and relative velocities of the corresponding obstacles with respect to the velocity of the vehicle. Since the ultrasonic sensors 241, 242, 243, and 244 have narrow and short-range detection areas, they may measure distances to obstacles that are close to the vehicle, and relative velocities of the corresponding obstacles with respect to the velocity of the vehicle. In addition, the radar sensors 210, 220, and 230 and the ultrasonic sensors 241, 242, 243, and 244 may measure the positions of the obstacles.

Therefore, when other vehicles are positioned at the left side of the vehicle, they may be detected by all of the radar sensor 220 and the ultrasonic sensors 243, and when other vehicles are positioned at the right side of the vehicle, they may be detected by all of the radar sensor 230 and the ultrasonic sensors 244. That is, some of the other vehicles may be present in an overlapped detection area of the radar sensor and the ultrasonic sensors.

Meanwhile, since technology for avoiding a side collision when a vehicle that is parallel parked exits a parking space is primarily described in exemplary embodiments of the present invention, a first sensor group including the left side ultrasonic sensor 243 and the left rear radar sensor 220 and a second sensor group including the right side ultrasonic sensor 244 and the right rear radar sensor 230 may mainly be used. In reality, when a vehicle that is parallel parked exits a parking space, it is obvious to avoid the collisions of other vehicles parked in front of and behind the vehicle, and thus, all of the plurality of ultrasonic sensors 241 mounted on the front surface of the vehicle and the plurality of ultrasonic sensors 242 mounted on the rear surface of the vehicle, as well as the radar sensor 210 mounted on the front surface of the vehicle, may also be used.

The side collision avoidance technology in exemplary embodiments of the present invention is used to avoid side collisions when a vehicle that is parallel parked exits a parking space, but is not limited thereto. For example, the technology may also be used to avoid side collisions when the vehicle is travelling. Further, the technology may be applied in other parking situations, e.g., when the vehicle is parked in a parking lot with other vehicles in a plurality of parallel or diagonal rows.

The brake driver 30 may drive a brake under control of the controller 50.

The warning unit 40 may output an alarm under control of the controller 50.

The controller 50 generally controls the aforementioned respective elements to perform the functions thereof normally.

In particular, the controller 50 may combine sensor data from the radar sensor mounted on the rear surface of the vehicle with sensor data from the ultrasonic sensor mounted on the side surface of the vehicle to generate the combined data, detect an obstacle on the basis of the combined data, and predict whether or not the vehicle collides with the detected obstacle on the basis of the combined data.

In addition, when the collision with the obstacle is predicted, the controller 50 may control the brake driver 30 to stop the vehicle.

In addition, when the collision with the obstacle is predicted, the controller 50 may control the warning unit 40 to warn a driver of the predicted collision.

In addition, when the collision with the obstacle is predicted, the controller 50 may control the brake driver 30 to stop the vehicle, and then control the warning unit 40 to warn the driver of the predicted collision.

Hereinafter, the configuration of the controller 50 will be detailed with reference to FIG. 3.

Figure 3:
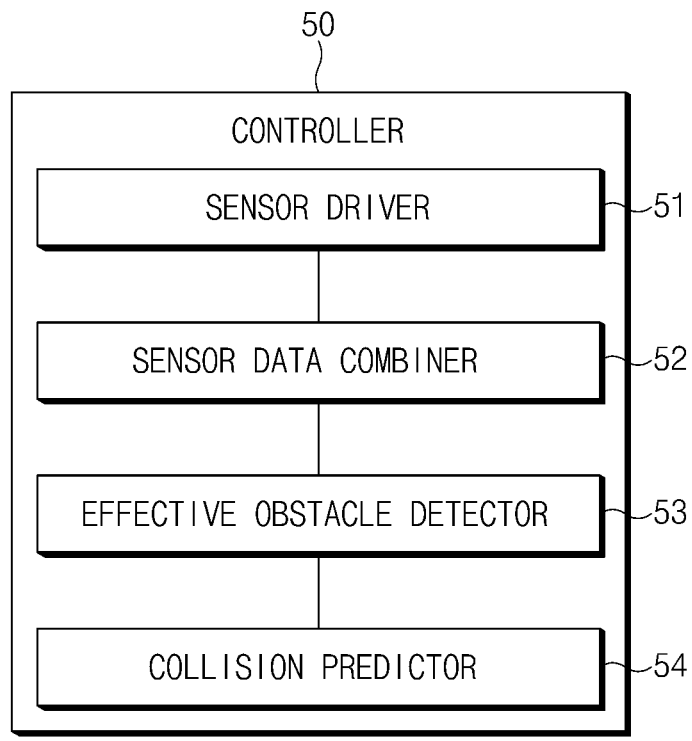
FIG. 3 is a block diagram of a controller that controls a side collision avoidance system of a vehicle, according to an exemplary embodiment of the present invention.

FIG. 3 illustrates the detailed configuration of a controller that controls a side collision avoidance system of a vehicle, according to an exemplary embodiment of the present invention.

As illustrated in FIG. 3, the controller 50, according to the exemplary embodiment of the present invention, includes a sensor driver 51, a sensor data combiner 52, an effective obstacle detector 53, and a collision predictor 54.

With respect to each of the aforementioned elements, first, the sensor driver 51 may determine whether a vehicle that is parallel parked is in a left-side exit mode or in a right-side exit mode when exiting a parking space, and activate a sensor group corresponding to the determined exit mode. Here, the sensor driver 51 may receive the input of a driver to determine the left-side exit mode or the right-side exit mode, and may also be interlocked with a smart parking assist system (SPAS) mounted in the vehicle to determine the left-side exit mode or the right-side exit mode. Here, the sensor driver 51 may obtain information from an in-vehicle network system. The in-vehicle network system includes a controller area network (CAN), a local interconnect network (LIN), a FlexRay network, and a media oriented system transport (MOST).

For example, the sensor driver 51 may drive the first sensor group including the left side ultrasonic sensor 243 and the left rear radar sensor 220 in the left-side exit mode, and may drive the second sensor group including the right side ultrasonic sensor 244 and the right rear radar sensor 230 in the right-side exit mode.

Figure 4:
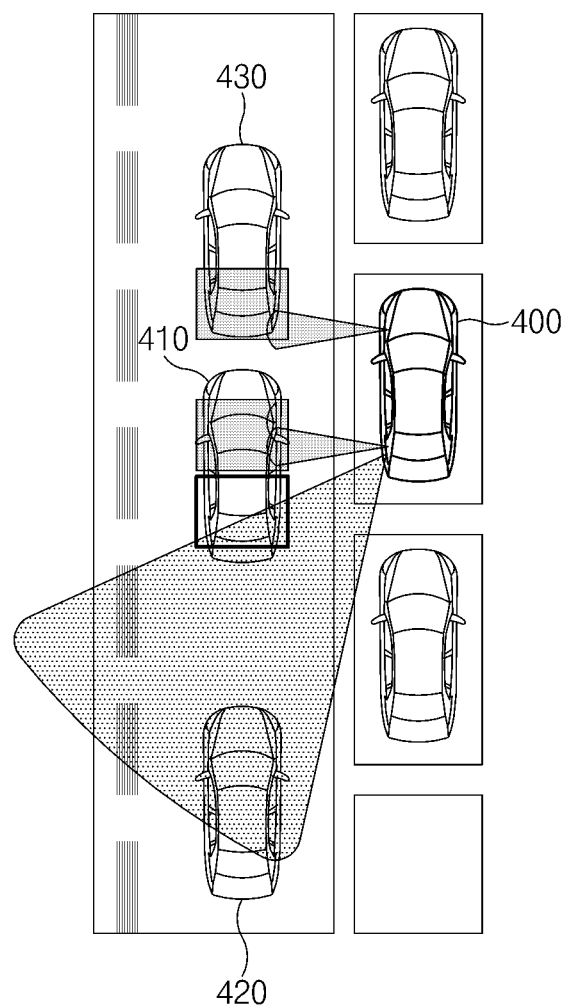
FIG. 4 is a schematic diagram of a vehicle including obstacles detected by sensors, according to an exemplary embodiment of the present invention.

Obstacles detected by the first sensor group activated by the sensor driver 51 are illustrated by way of example in FIG. 4.

In FIG. 4, "410", "420", and "430" indicate other vehicles positioned at the left side and left rear of a vehicle 400. The vehicle 420 may be detected by the left rear radar sensor 220; the vehicle 430 may be detected by the left side ultrasonic sensor 243; and the vehicle 410 may be detected by the left rear radar sensor 220 and the left side ultrasonic sensor 243. Here, since the vehicle 410 is detected by the left rear radar sensor 220 and the left side ultrasonic sensor 243, it may be detected with high accuracy through the combination of radar sensor data and ultrasonic sensor data.

Next, the sensor data combiner 52 may combine sensor data from the radar sensor unit 10 with sensor data from the ultrasonic sensor unit 20.

In other words, the sensor data combiner 52 may combine the radar sensor data with the ultrasonic sensor data on the basis of the following Equation 1 to generate the combined data:

$$\widehat{X_3} = \widehat{X_1} + \lambda(\widehat{X_2} - \widehat{X_1})$$

$$P_3 = P_1 - (P_1 - P_{1/2})U^{-1}{}_{1/2}(P_1 - P_{1/2})^T \qquad \text{Equation 1}$$

Here, $\widehat{X_1}$ is ultrasonic sensor data indicating a position of an obstacle, $\widehat{X_2}$ is radar sensor data indicating a position of an obstacle, and $\widehat{X_3}$ is combined data indicating a position of an obstacle.

In addition, $P_1$ indicates covariance of ultrasonic sensor data, $P_2$ indicates covariance of radar sensor data, $P_3$ indicates covariance of combined data, and $P_{1/2}$ indicates cross covariance of ultrasonic sensor data and radar sensor data.

In addition, $\lambda = (P_1 - P_{1/2})U^{-1}{}_{1/2}$, $U_{1/2} = P_1 + P_2 - P_{1/2}$, and $P_{1/2} = \rho\sqrt{P_1 \cdot P_2}$ may be satisfied. Here, $\rho$ indicates an effective correlation coefficient (for example, 0.4).

Figure 5:
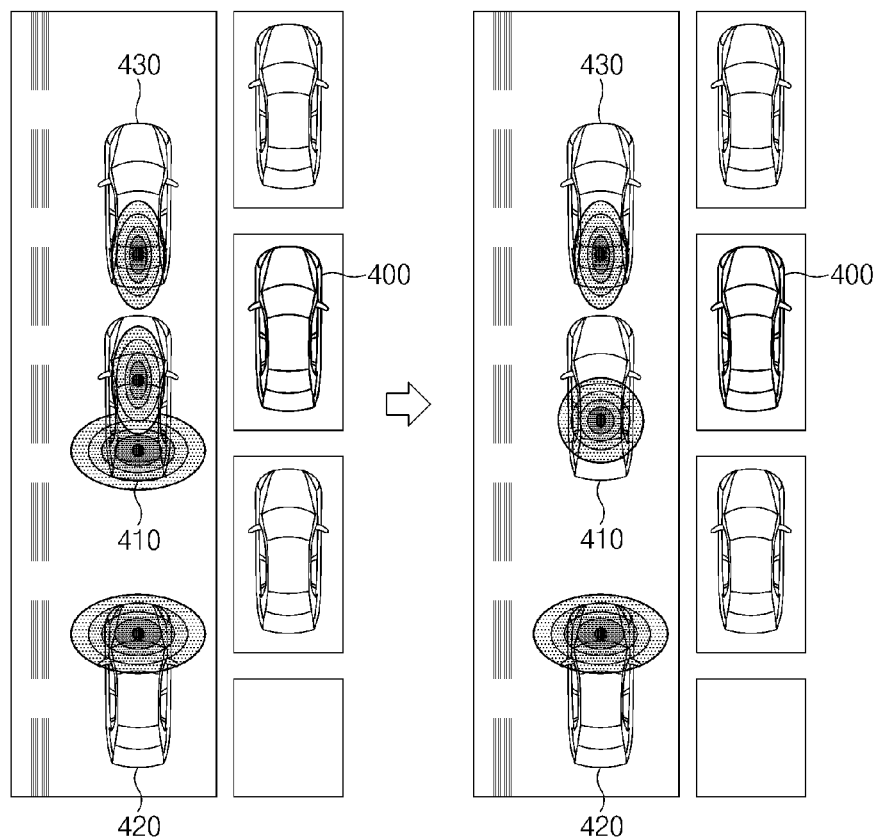
FIG. 5 is a schematic diagram of a vehicle including results of combining radar sensor data with ultrasonic sensor data, according to an exemplary embodiment of the present invention.

Meanwhile, the sensor data with respect to the vehicles 410, 420, and 430 detected by the left side ultrasonic sensor 243 and/or the left rear radar sensor 220 in FIG. 4 may be illustrated as a left-side image of FIG. 5 on the basis of reliability of the corresponding sensors.

In order words, the image of the vehicle 410 detected by the left side ultrasonic sensor 243 may be illustrated as an ellipsoidal shape (hereinafter, a "first ellipse") of which the top and bottom are long, and the image of the vehicle 420 detected by the left rear radar sensor 220 may be illustrated as an ellipsoidal shape (hereinafter, a "second ellipse") of which the left and right sides are long. Here, an area of the second ellipse is larger than that of the first ellipse.

The sensor data combined by the sensor data combiner 52 may be illustrated as a right-side image of FIG. 5. In other words, the first ellipse and the second ellipse may be combined and illustrated as a single circular shape. Since a size of the circle is similar to a width of the vehicle, the obstacle (vehicle) may be detected accurately.

This is further detailed with reference to FIG. 6. The covariance $P_1$ of the ultrasonic sensor data and the covariance $P_2$ of the radar sensor data may be combined on the basis of the above Equation 1 to get the covariance $P_3$ of the combined data.

Figure 6:
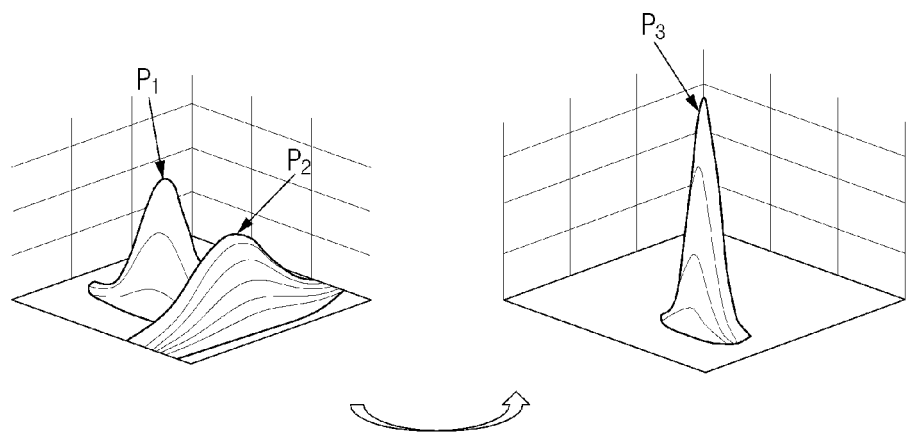
FIG. 6 illustrates graphs with details of results of combining radar sensor data with ultrasonic sensor data, according to an exemplary embodiment of the present invention.

As illustrated in FIG. 6, a peak of the combined data is higher than that of the ultrasonic sensor data and the radar sensor data. Therefore, the obstacle may be detected with high accuracy by using the combined data.

Figure 7:
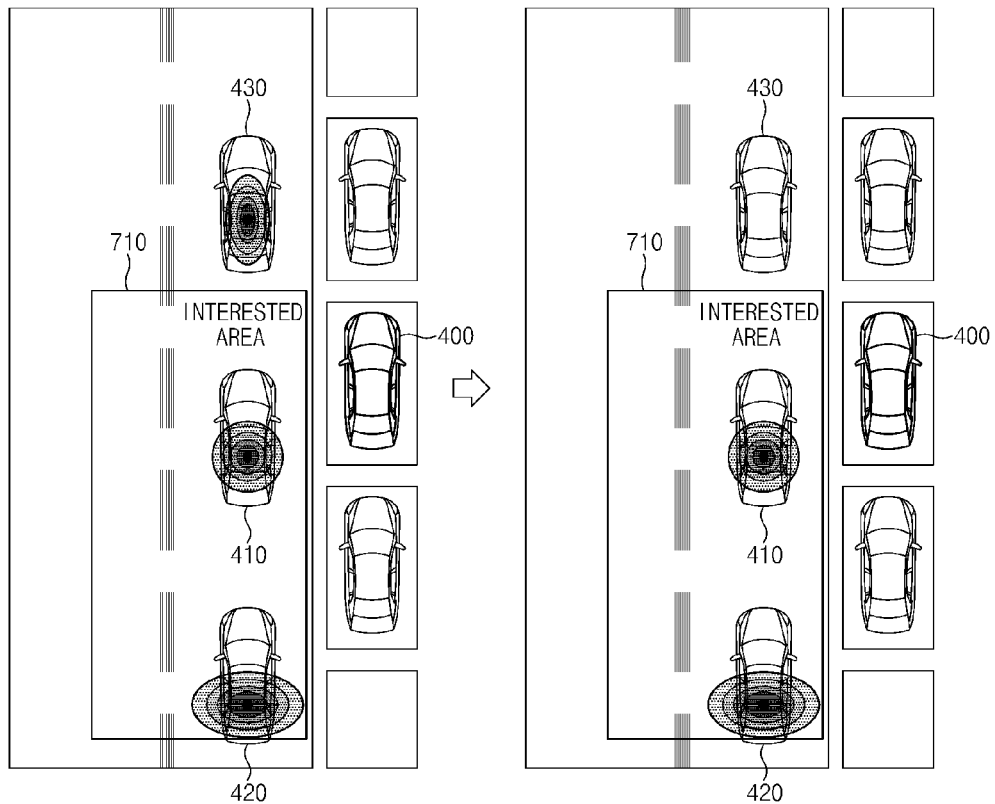
FIG. 7 schematically illustrates an interested area among results of combined sensor data, according to an exemplary embodiment of the present invention.

Next, the effective obstacle detector 53 may detect obstacles on the basis of the data (hereinafter, "the combined data") combined by the sensor data combiner 52, and may detect obstacles positioned in an interested area 710 among the detected obstacles as effective obstacles. Here, the interested area 710 may be a predetermined area which is illustrated in FIG. 7. Since the vehicle 430 is not positioned in the interested area 710, it is not considered to be an effective obstacle. The vehicles 410 and 420 are the effective obstacles.

In addition, the effective obstacle detector 53 may continuously predict the positions of the obstacles positioned in the interested area 710.

In particular, even when the sensor data from the radar sensors and the sensor data from the ultrasonic sensors are not continuously transmitted, the effective obstacle detector 53 may predict the positions of the obstacles on the basis of Equation 2 and Equation 3.

Figure 8:
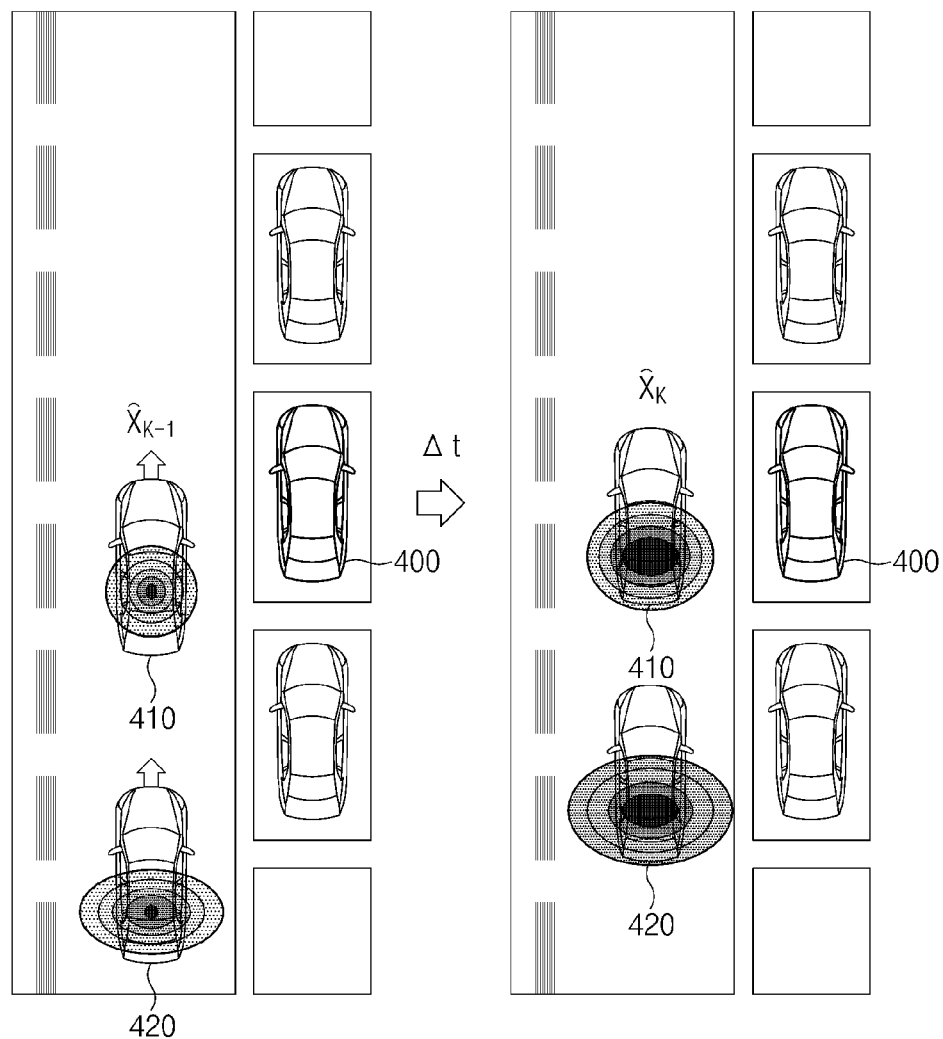
FIG. 8 schematically illustrates results of estimating positions of obstacles, according to an exemplary embodiment of the present invention.

In other words, the effective obstacle detector 53 may estimate the positions of the obstacles according to time on the basis of Equation 2. The estimated positions of the obstacles are illustrated in FIG. 8.

$$\hat{X}_k = F_{k-1}\hat{X}_{k-1} + G_k w_k \qquad \text{Equation 2}$$

Here, $\hat{X}_k$ indicates an estimated position of an obstacle at a point in time k, $\hat{X}_{k-1}$ indicates an estimated position of the obstacle at a point in time k−1, F indicates an obstacle state change mathematical model, G indicates an input model related to the state change, and W indicates a system input (noise and the like).

In addition, the effective obstacle detector 53 may update the covariance on the basis of the following Equation 3:

$$P_k = F_{k-1} P_{k-1} F_{k-1}^T + R_W \qquad \text{Equation 3}$$

Here, $P_k$ indicates covariance at the point in time k, $P_{k-1}$ indicates covariance at the point in time k−1, and Rw indicates model error covariance.

In addition, the effective obstacle detector 53 may determine whether or not the obstacle is positioned in the interested area, on the basis of Equation 4. In other words, it may be determined that the obstacle is out of the interested area when satisfying the following Equation 4:

$$\sqrt{tr(P_k)} > P_{limit} \qquad \text{Equation 4}$$

Here, $P_{limit}$ indicates an upper limit (threshold value) of valid covariance, and tr indicates a function for calculating the addition or subtraction of respective components in a matrix.

In such a technique for predicting the positions of the obstacles according to time, a transmission cycle of data from the sensors may be 100 ms. However, it may also be used to predict the positions of the obstacles with a transmission cycle of 50 ms.

Figure 9:
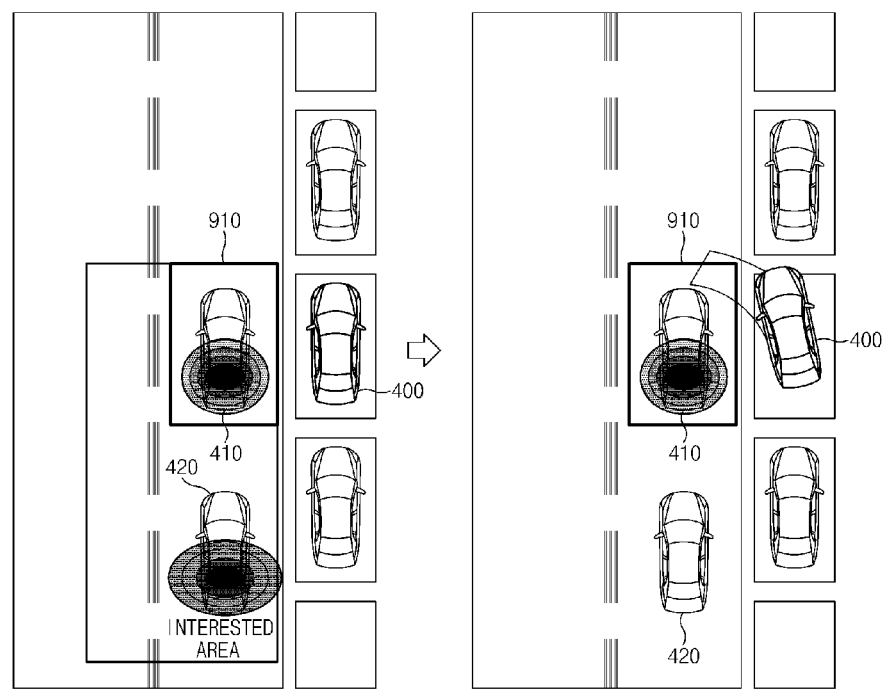
FIG. 9 schematically illustrates a potential collision area, according to an exemplary embodiment of the present invention.

Next, the collision predictor 54 may detect, as a final obstacle, an obstacle positioned in a potential collision area 910 among the effective obstacles detected by the effective obstacle detector 53. In other words, the collision predictor 54 may detect the vehicle 410 positioned in the potential collision area 910 as illustrated in FIG. 9.

The collision predictor 54 may predict collision or non-collision with the final obstacle, according to a collision probability with the final obstacle on the basis of a standard deviation of the covariance of the combined data. In other words, the collision predictor 54 may calculate the standard deviation using the covariance of the combined data generated by the sensor data combiner 52, calculate the collision probability in consideration of the calculated standard deviation, and predict the collision with the final obstacle when the calculated collision probability exceeds a reference value.

Figure 10:
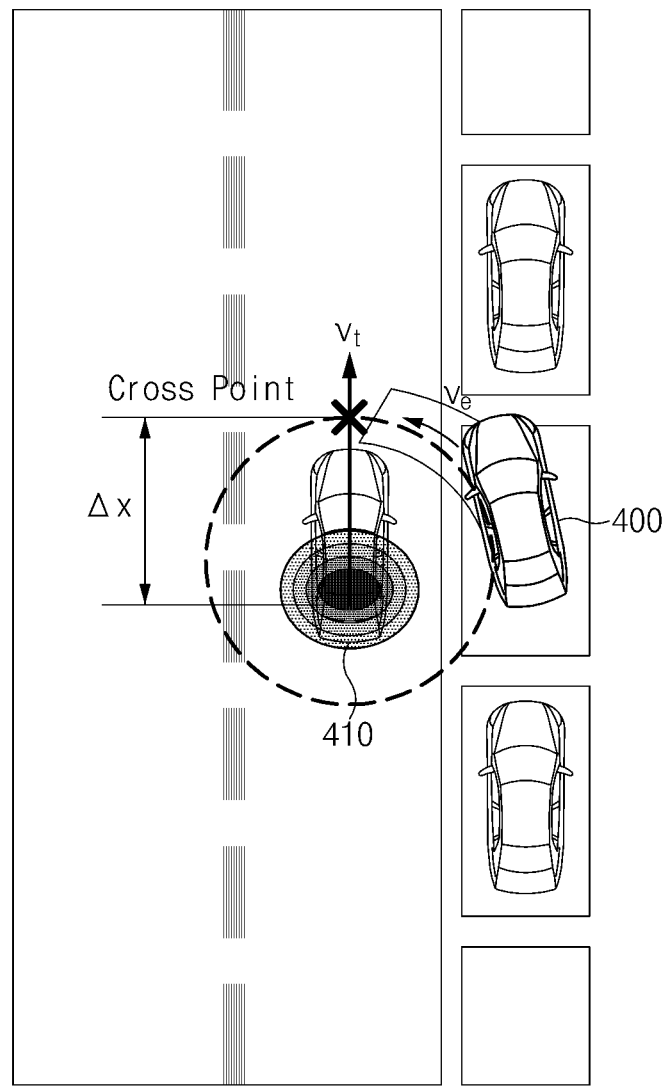
FIG. 10 schematically illustrates a process of calculating a collision probability with respect to a final obstacle on the basis of a standard deviation of covariance of combined data, according to an exemplary embodiment of the present invention.

With reference to FIG. 10, the collision predictor 54 may calculate the collision probability D with respect to the final obstacle on the basis of the standard deviation of the covariance of the combined data by using the following Equation 5:

$$D(t_{inv}) = \exp\left(-\frac{(t_{inv} - \bar{t}_{inv}^{dan})^2}{2\sigma_t^2}\right) \qquad \text{Equation 5}$$

Here, $t_{inv}$ is an inverse number of TTC (Time To Collision), and satisfies $$t_{inv} = TTC^{-1} = \frac{v_e - v_t}{\Delta x}.$$

Here, $v_e$ indicates a velocity of a vehicle (the vehicle 400), $v_t$ indicates a velocity of an obstacle (the vehicle 410), and $\Delta x$ indicates a distance to collision.

In addition, $\bar{t}_{inv}^{dan}$ indicates a criterion $t_{inv}$ (critical time) for determining collision risk, and $\sigma_t$ indicates the standard deviation of the covariance of the combined data.

By applying $\sigma_t$ to Equation 5, the collision probability with the obstacle may be predicted with high accuracy.

In the exemplary embodiments of the present invention, the side collision avoidance system that is configured as a single independent system is described by way of example. However, the functions of the side collision avoidance system may be added to the well-known SPAS.

Figure 11:
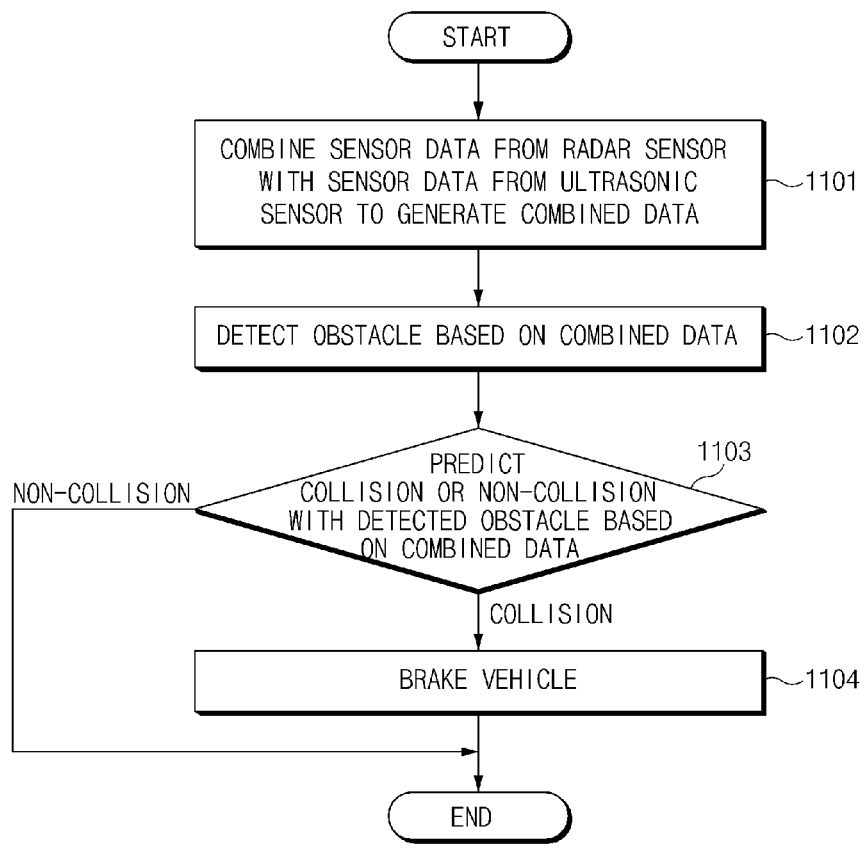
FIG. 11 is a flowchart of a side collision avoidance method for a vehicle, according to an exemplary embodiment of the present invention.

FIG. 11 illustrates a flowchart of a side collision avoidance method for a vehicle, according to an exemplary embodiment of the present invention.

First of all, the controller 50 may combine sensor data (hereinafter, "radar sensor data") from the radar sensor with sensor data from the ultrasonic sensor (hereinafter, "ultrasonic sensor data") to generate combined data in operation 1101.

Next, the controller 50 may detect an obstacle on the basis of the combined data in operation 1102.

Thereafter, the controller 50 may predict collision or non-collision with the detected obstacle on the basis of the combined data in operation 1103.

Then, when the collision is predicted, the brake driver may brake the vehicle in operation 1104.

Meanwhile, the above-stated method according to the exemplary embodiment of the present invention may be written as a computer program. Codes and code segments constituting the program may easily be inferred by a computer programmer skilled in the art. In addition, the written program may be stored in a computer-readable recording medium (an information storage medium) and be read and executed by a computer, thereby implementing the method according to the exemplary embodiment of the present invention. The recording medium includes all types of computer-readable recording media.

As set forth above, the side collision avoidance system and method for a vehicle may combine data from radar sensors mounted on the front and rear surfaces of the vehicle with data from ultrasonic sensors mounted on the side surfaces of the vehicle and detect obstacles on the basis of the combined data, thereby increasing accuracy in the detection of obstacles and predicting the probability of collisions with obstacles with high accuracy.

In addition, the side collision avoidance system may provide optimal performance by allowing the radar sensors and the ultrasonic sensors to complement each other against the disadvantages thereof.

Furthermore, the present inventive concept may be applied to an SPAS, a blind spot detection (BSD) system, a rear cross traffic alert (RCTA) system, a smart cruise control (SCC) system, and the like, to thereby improve performance.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A side collision avoidance system for a vehicle, comprising:
a plurality of radar sensors configured to detect an obstacle around the vehicle;
a plurality of ultrasonic sensors configured to detect the obstacle around the vehicle;
a controller configured to:
combine radar sensor data from the radar sensors with ultrasonic sensor data from the ultrasonic sensors to generate combined data;
detect the obstacle on the basis of the combined data; and
predict collision or non-collision with the detected obstacle on the basis of the combined data; and
a brake driver configured to brake the vehicle when the collision is predicted,
wherein the controller generates covariance of the radar sensor data, covariance of the ultrasonic sensor data, and covariance of the combined data on the basis of cross-covariance of the ultrasonic sensor data and the radar sensor data.

2. The side collision avoidance system according to claim 1, further comprising a warning unit outputting an alarm when the collision is predicted.

3. The side collision avoidance system according to claim 1, wherein the controller calculates a collision probability with the obstacle in consideration of a standard deviation of the covariance of the combined data, and predicts the collision or non-collision with the detected obstacle on the basis of the calculated collision probability.

4. The side collision avoidance system according to claim 1, wherein the controller comprises:
a sensor driver driving a radar sensor and an ultrasonic sensor provided in a direction that is determined according to a left-side or right-side exit mode of the vehicle that is parallel parked;
a sensor data combiner combining the radar sensor data with the ultrasonic sensor data;
an effective obstacle detector detecting a plurality of obstacles on the basis of the combined data and detecting the plurality of obstacles positioned in an interested area among the detected plurality of obstacles as effective obstacles; and
a collision predictor detecting the obstacle positioned in a potential collision area among the effective obstacles detected by the effective obstacle detector as a final obstacle, and calculating a collision probability with the final obstacle to predict collision or non-collision.

5. The side collision avoidance system according to claim 4, wherein the sensor driver determines the left-side or right-side exit mode through at least one of a controller area network (CAN), a local interconnect network (LIN), a FlexRay network, and a media oriented system transport (MOST).

6. The side collision avoidance system according to claim 4, wherein the sensor data combiner generates covariance of the radar sensor data, covariance of the ultrasonic sensor data, and covariance of the combined data on the basis of cross-covariance of the ultrasonic sensor data and the radar sensor data.

7. The side collision avoidance system according to claim 4, wherein the effective obstacle detector continuously detects whether or not the effective obstacles are out of the interested area, on the basis of mathematical models of obstacle state changes.

8. The side collision avoidance system according to claim 4, wherein the collision predictor calculates the collision probability with the obstacle in consideration of a standard deviation of the covariance of the combined data, and predicts the collision or non-collision with the obstacle on the basis of the calculated collision probability.

9. The side collision avoidance system according to claim 8, wherein the collision predictor calculates the collision probability (D) with the obstacle on the basis of the standard deviation of the covariance of the combined data by using the following equation:

$$D(t_{inv}) = \exp\left(-\frac{(t_{inv} - \bar{t}_{inv}^{dan})^2}{2\sigma_t^2}\right)$$

$$t_{inv} = TTC^{-1} = \frac{v_e - v_t}{\Delta x}$$

where $v_e$ indicates a velocity of the vehicle,
$v_t$ indicates a velocity of the final obstacle,
$\Delta x$ indicates a distance to collision,
$\bar{t}_{inv}^{dan}$ indicates a threshold time, and
$\sigma_t$ indicates the standard deviation of the covariance of the combined data.

10. A side collision avoidance method for a vehicle, comprising the steps of:
generating, by a controller, combined data by combining sensor data from radar sensors with sensor data from ultrasonic sensors;
detecting, by the controller, an obstacle on the basis of the combined data;
predicting, by the controller, collision or non-collision with the detected obstacle on the basis of the combined data; and
braking, by a brake driver, the vehicle when the collision is predicted, wherein the step of generating the combined data further comprises generating covariance of the radar sensor data, covariance of the ultrasonic sensor data, and covariance of the combined data on the basis of cross-covariance of the ultrasonic sensor data and the radar sensor data.

11. The side collision avoidance method according to claim 10, further comprising the step of:
outputting an alarm when the collision is predicted.

12. The side collision avoidance method according to claim 10, further comprising driving, by the controller, one of the radar sensors and one of the ultrasonic sensors provided in a direction that is determined according to a left-side or right-side exit mode of the vehicle that is parallel parked, before the step of generating the combined data.

13. The side collision avoidance method according to claim 10, wherein the step of detecting the obstacle comprises detecting a plurality of obstacles on the basis of the combined data, and detecting the plurality of obstacles positioned in an interested area among the detected obstacles as effective obstacles.

14. The side collision avoidance method according to claim 13, wherein the step of detecting the obstacle comprises continuously detecting whether or not the effective obstacles are out of the interested area, on the basis of mathematical models of obstacle state changes.

15. The side collision avoidance method according to claim 13, wherein the step of predicting the collision or non-collision comprises detecting an obstacle positioned in a potential collision area among the effective obstacles as a final obstacle, and calculating a collision probability with the final obstacle to predict collision or non-collision.

16. The side collision avoidance method according to claim 15, wherein the step of predicting the collision or non-collision comprises calculating the collision probability with the final obstacle in consideration of a standard deviation of the covariance of the combined data.

17. The side collision avoidance method according to claim 16, wherein the step of predicting the collision or non-collision comprises calculating the collision probability (D) with the final obstacle on the basis of the standard deviation of the covariance of the combined data by using the following equation:

$$D(t_{inv}) = \exp\left(-\frac{(t_{inv} - \bar{t}_{inv}^{dan})^2}{2\sigma_t^2}\right)$$

$$t_{inv} = TTC^{-1} = \frac{v_e - v_t}{\Delta x}$$

where $v_e$ indicates a velocity of the vehicle,
$v_t$ indicates a velocity of the final obstacle,
$\Delta x$ indicates a distance to collision,
$\bar{t}_{inv}^{dan}$ indicates a threshold time, and
$\sigma_t$ indicates the standard deviation of the covariance of the combined data.

* * * * *